May 30, 1944.  J. L. HOUGHTON  2,350,112
LENS SYSTEM
Filed March 2, 1942  2 Sheets-Sheet 1

| EXAMPLE 1 | | f/2 | f = 99 mm. |
|---|---|---|---|
| LENS | GLASS | RADII | THICKNESSES |
| | $N_D$ — $V$ | | |
| I | 1.51508 — 57.0 | $R_1$ = −124.10<br>$R_2$ = +124.10 | $t_1$ = 1.00<br>$S_1$ = 0.70 |
| II | 1.62081 — 57.2 | $R_3$ = +147.14<br>$R_4$ = −152.08 | $t_2$ = 6.00 |
| M | | $R_5$ = −200.00 | $S_2$ = 193.00 |

| EXAMPLE II | | f/0.604 | f = 100 mm. |
|---|---|---|---|
| LENS | GLASS | RADII | THICKNESSES |
| | $N_D$ — $V$ | | |
| I | 1.8012 — 25.5 | $R_1$ = +413.33<br>$R_2$ = −413.33 | $t_1$ = 21.16<br>$S_1$ = 8.28 |
| II | 1.8012 — 25.5 | $R_3$ = −206.66<br>$R_4$ = +206.66 | $t_2$ = 5.52<br>$S_2$ = 8.28 |
| III | 1.8012 — 25.5 | $R_5$ = +413.33<br>$R_6$ = −413.33 | $t_3$ = 21.16 |
| M | | $R_7$ = −197.47 | $S_3$ = 177.61 |

JAMES L. HOUGHTON
INVENTOR

BY
ATT'Y & AG'T

May 30, 1944.  J. L. HOUGHTON  2,350,112
LENS SYSTEM
Filed March 2, 1942          2 Sheets-Sheet 2

| EXAMPLE III | | f/1.04 | | f = 100 mm. |
|---|---|---|---|---|
| LENS | GLASS | | RADII | THICKNESSES |
| | $N_D$ | $V$ | | |
| I | 1.6117 | 57.1 | $R_1 = +420.95$ | $t_1 = 11.56$ |
| | | | $R_2 = -420.95$ | $S_1 = 5.78$ |
| II | 1.5231 | 55.9 | $R_3 = -180.00$ | $t_2 = 1.93$ |
| | | | $R_4 = +180.00$ | $S_2 = 5.78$ |
| III | 1.6117 | 57.1 | $R_5 = +420.95$ | $t_3 = 11.56$ |
| M | | | $R_6 = -420.95$ | $S_3 = 184.09$ |
| | | | $R_7 = -197.53$ | |

| EXAMPLE IV | | f/4.0 | | f = 100 mm. |
|---|---|---|---|---|
| LENS | GLASS | | RADII | THICKNESSES |
| | $N_D$ | $V$ | | |
| I | 1.5231 | 55.9 | $R_1 = -65.89$ | $t_1 = 2.05$ |
| | | | $R_2 = +289.64$ | $S_1 = 0.01$ |
| II | 1.6117 | 57.1 | $R_3 = +278.93$ | $t_2 = 3.08$ |
| | | | $R_4 = -80.99$ | $S_2 = 102.61$ |
| M | | | $R_5 = -205.22$ | |

*JAMES L. HOUGHTON*
INVENTOR

BY

ATTY & AGT

Patented May 30, 1944

2,350,112

UNITED STATES PATENT OFFICE 2,350,112

LENS SYSTEM

James Leonard Houghton, Harrow, England, assignor to Eastman Kodak Company, Rochester, N. Y., a corporation of New Jersey Application March 2, 1942, Serial No. 433,046
In Great Britain March 7, 1941

13 Claims. (Cl. 88—57)

This invention relates to an image-forming objective comprising a spherical mirror or mirror lens.

An accurately formed spherical mirror, while being free from coma, astigmatism and distortion, suffers from spherical aberration which has been eliminated in the past by the use of a figured plate disposed at the centre of curvature of the mirror. Such plate is extremely difficult to make owing to the figuring or departure from flatness of at least one of its surfaces.

An object of the present invention is to provide an objective of large aperture and capable of giving sharp definition over a wide field.

A further object is to provide a spherical mirror with a lens system comprising two or more lens elements, such system being designed to remove at least the spherical aberration of the mirror.

A still further object of the invention is to remove the spherical aberration of a spherical mirror by the employment of a lens system which is of infinite focal length, or of small power compared with that of the mirror, and which is over-corrected for spherical aberration so as to compensate for the spherical under-correction of the mirror.

In the accompanying drawings there are shown three types of lens system according to preferred embodiments of the invention.

The following are some of the lenses which have been designed to incorporate the preferred embodiments of the invention. They are given together for convenience and are separately discussed in detail afterwards.

Example I f/2          $f = 99$ mm.

| Lens | $N_D$ | V | Radii | Thicknesses |
|---|---|---|---|---|
| I | 1.51508 | 57.0 | $R_1 = -124.10$ | $t_1 = 1.00$ |
|   |         |      | $R_2 = +124.10$ | $s_1 = 0.70$ |
| II | 1.62081 | 57.2 | $R_3 = +147.14$ | $t_2 = 6.00$ |
|    |         |      | $R_4 = -152.08$ | $s_2 = 193.00$ |
| M |  |  | $R_5 = -200.00$ |  |

Example II f/0.604          $f = 100$ mm.

| Lens | $N_D$ | V | Radii | Thicknesses |
|---|---|---|---|---|
| I | 1.8012 | 25.5 | $R_1 = +413.33$ | $t_1 = 21.16$ |
|   |        |      | $R_2 = -413.33$ | $s_1 = 8.28$ |
| II | 1.8012 | 25.5 | $R_3 = -206.66$ | $t_2 = 5.52$ |
|    |        |      | $R_4 = +206.66$ | $s_2 = 8.28$ |
| III | 1.8012 | 25.5 | $R_5 = +413.33$ | $t_3 = 21.16$ |
|     |        |      | $R_6 = -413.33$ | $s_3 = 177.61$ |
| M |  |  | $R_7 = -197.47$ |  |

Example III f/1.04          $f = 100$ mm.

| Lens | $N_D$ | V | Radii | Thicknesses |
|---|---|---|---|---|
| I | 1.6117 | 57.1 | $R_1 = +420.95$ | $t_1 = 11.56$ |
|   |        |      | $R_2 = -420.95$ | $s_1 = 5.78$ |
| II | 1.5231 | 55.9 | $R_3 = -180.00$ | $t_2 = 1.93$ |
|    |        |      | $R_4 = +180.00$ | $s_2 = 5.78$ |
| III | 1.6117 | 57.1 | $R_5 = +420.95$ | $t_3 = 1.93$ |
|     |        |      | $R_6 = +420.95$ | $s_3 = 184.09$ |
| M |  |  | $R_7 = -197.53$ |  |

Example IV

| Lens | $N_D$ | V | Radii | Thicknesses |
|------|-------|------|-----------------|-------------|
| I    | 1.5231 | 55.9 | $R_1 = -65.89$  |             |
|      |        |      | $R_2 = +289.64$ | $t_1 = 2.05$ |
|      |        |      |                 | $s_1 = 0.01$ |
| II   | 1.6117 | 57.1 | $R_3 = +278.93$ |             |
|      |        |      | $R_4 = -80.99$  | $t_2 = 3.08$ |
|      |        |      |                 | $s_2 = 102.61$ |
| M    |        |      | $R_5 = -205.22$ |             |

In the above examples and accompanying drawings $f$ is the focal length of the lens-mirror system, the relative aperture being given in the usual way. $N_D$ is the index of refraction for the D line of the spectrum, V is the dispersion index of the glass, while R, $t$ and $s$ represent respectively the radii, thicknesses and air spaces in the lens-mirror system. A negative sign in the above examples denotes a surface concave to the incident light, while a positive sign denotes a surface convex to the incident light.

Figure 1:
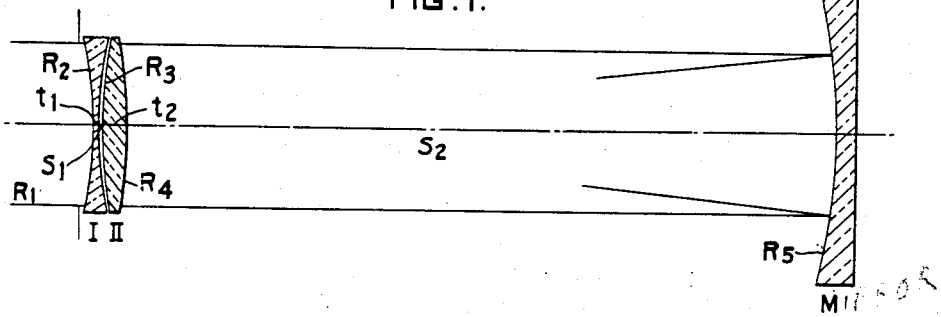
Fig. 1 shows a spherical mirror with a correcting lens system comprising two lens elements corresponding to Example I given below.
Figure 2:
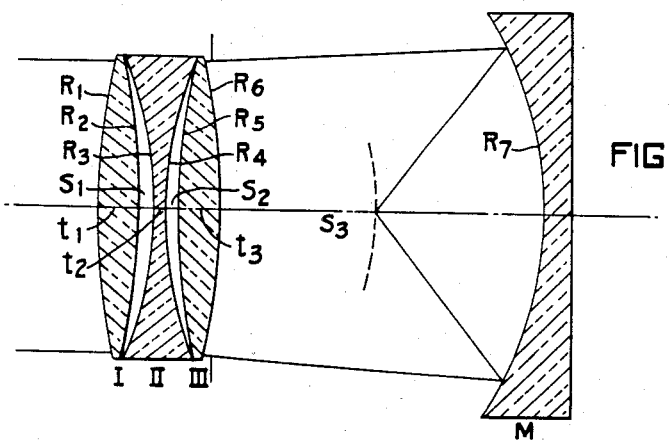
Fig. 2 shows a correcting lens system comprising three lens elements corresponding to Example II below.
Figure 3:
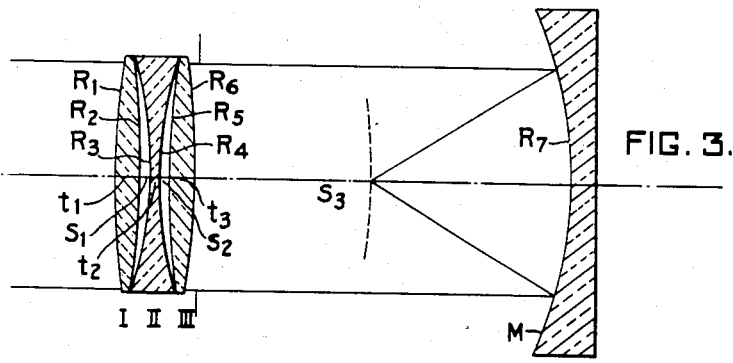
Fig. 3 shows another three element lens system, the relative aperture of the lens-mirror system being f/1.04.
Figure 4:
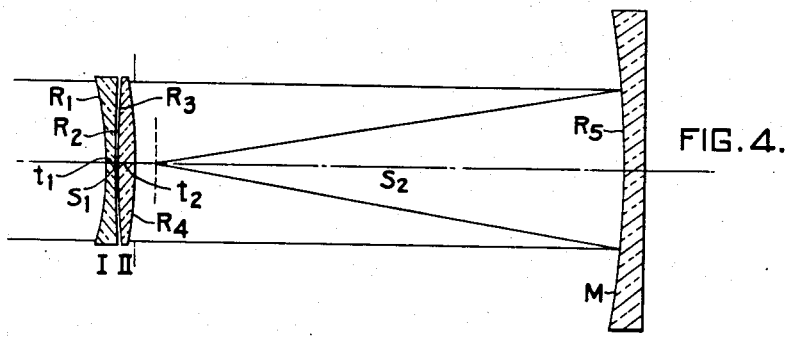
Fig. 4 shows a two lens element correcting system positioned near the focus of the mirror to provide a flattened field.

In Examples I–III corresponding to Figs. 1–3, the correcting lens system is disposed at the centre of curvature of the reflecting mirror M and a curved image, free from spherical aberration is formed at the focus of the mirror. In Example IV, however, the correcting lens system is disposed near the focus of the mirror in order to provide a flattened field. It is to be understood, however, that the correcting lens system can be placed at any position in the incident light beam. In general, the choice of position would depend upon the kind of image field desired. With the correcting lens system disposed at the focus position, Fig. 4, the relative aperture is smaller than when the correcting lens system is disposed at the centre of curvature of the mirror; this is due to the presence of astigmatism.

The correcting lens system is preferably situated at the centre of curvature of the mirror as at this position there is only spherical aberration in the mirror requiring correction. When the stop is at any other position, the coma of the lens system balances that of the mirror.

Referring to Fig. 1, lens I preferably comprises a soft crown glass and lens II a dense barium crown glass. Preferably, glasses of the type disclosed in United States Re-issue Patent No. 21,175—Morey, may be used in place of the dense barium crown glass to give increased refractive index differences. If desired, the air space between lenses I and II may be eliminated by cementing the two lenses together.

The lenses of the triplet according to Example II, Fig. 2, are made from the same type of glass; it is preferable to use glass with as high a refractive index as possible if this type of triplet is employed. According to Example III, the lens elements of the triplet are made from different glasses.

From a consideration of the above examples it will be observed that large relative apertures are possible by using quite shallow curves for the correcting lenses.

When a triplet correcting lens system is used at the centre of curvature of the mirror M, it is preferable, in accordance with the invention, to make the system symmetrical i. e. the front and back lenses should be identical and equi-convex while the centre lens should be equi-concave. All three lens elements, however, may have the same refractive index.

It will be appreciated by those skilled in the art that other correcting lens systems for use with the spherical mirror may be readily designed for incorporation in any desired optical apparatus, preferably in photographic cameras; it will be understood, however, that the system may also be used with advantage for microscopes and telescopes.

Having thus described several preferred embodiments of my invention, I wish to point out that it is not limited to these particular lenses but is of the scope of the appended claims.

I claim:

1. A spherical reflecting element and a correcting lens system for correcting the spherical aberration of said element, said lens system consisting of a plurality of lens elements with substantially spherical refracting surfaces only being over-corrected for spherical aberration to compensate for the under-correction of the reflecting element, and also being of infinite focal length.

2. A front surfaced spherical reflecting element and a correcting lens system for correcting the spherical aberration of said element, said lens system having substantially infinite focal length, being over-corrected for spherical aberration to compensate for the under-correction of the reflecting element, and also being of small power compared with that of said element and the elements of said system having approximately the same dispersive index and having substantially spherical refracting surfaces only.

3. A spherical reflecting element and a correcting lens system for correcting the spherical aberration of said element, said lens system comprising a doublet in which one element is double concave with substantially equal radii and the other element is double convex, with substantially equal radii, said doublet being disposed at the centre of curvature of the spherical reflecting element, and being over-corrected for spherical aberration to compensate for spherical under-correction in said element.

4. A correcting lens system according to claim 3, in which the glasses composing the lens elements have substantially the same dispersion but have as high a difference of refractive index as possible.

5. A spherical reflecting element and a correcting lens system for correcting the spherical aberration of said element, said lens system having substantially infinite focal length and comprising a triplet of which the outer elements are equiconvex and have the same refractive index as each other while the middle element is equi-concave and in which the dispersive indices of the three elements are approximately the same and the refracting surfaces thereof are all substantially spherical.

6. A reflecting lens system comprising a concave mirror, a diaphragm substantially at the center of curvature of the mirror and a plurality of lens elements optically aligned at the diaphragm, the integrated power of the elements being substantially zero and the spherical aberration of the elements being effectively equal and opposite to that of the mirror.

7. A lens system according to claim 1 in which the lens elements are achromatic and substantially free from coma.

8. A lens system according to claim 1 in which there are only two lens elements, one positive and one negative, whose powers have equal absolute value and which are made of glass of substantially the same dispersive index, the positive element having an index of refraction greater than that of the negative element.

9. A reflecting lens system comprising a concave mirror, a diaphragm substantially at the center of curvature of the mirror and two lens elements of equal but opposite power optically aligned at the diaphragm, the dispersive indices of the elements being substantially equal and the refractive index of the positive element exceeding that of the negative element by at least .05.

10. A spherical reflecting mirror and a correcting lens system disposed at the center of curvature of said mirror for correcting the spherical aberration thereof and having the following characteristics approximately:

| Lens | Glass | | Radii | Thicknesses |
|---|---|---|---|---|
| | $N_D$ | V | | |
| I | 1.52 | 57 | $R_1=-1.24f$ | $t_1=.01f$ |
| | | | $R_2=+1.24f$ | $S_1=.007f$ |
| II | 1.62 | 57 | $R_3=+1.47f$ | $t_2=.06f$ |
| | | | $R_4=-1.52f$ | $S_2=1.93f$ |
| M | | | $R_5=-2.00f$ | | in which the first column gives the lens elements in order from the front and labels the mirror by the letter M, $N_D$ is the index of refraction for the D line of the spectrum, V is the dispersive index, $R_1$ to $R_5$ are the surface curvatures, $t_1$ and $t_2$ are the lens thicknesses, $S_1$ and $S_2$ are the airspaces, $f$ is the focal length of the system and the plus and minus signs refer respectively to surfaces convex and concave to the incident light.

11. A spherical reflecting mirror and a correcting lens system disposed at the center of curvature of said mirror for correcting the spherical aberration thereof and having the following characteristics approximately:

| Lens | Glass | | Radii | Thicknesses |
|---|---|---|---|---|
| | $N_D$ | V | | |
| I | 1.80 | 26 | $R_1=+4.13f$ | $t_1=.21f$ |
| | | | $R_2=-4.13f$ | $S_1=.08f$ |
| II | 1.80 | 26 | $R_3=-2.07f$ | $t_2=.05f$ |
| | | | $R_4=+2.07f$ | $S_2=.08f$ |
| III | 1.80 | 26 | $R_5=-4.13f$ | $t_3=.21f$ |
| | | | $R_6=-4.13f$ | $S_3=1.78f$ |
| M | | | $R_7=-1.97f$ | | in which the first column gives the lens elements in order from the front and labels the mirror by the letter M, $N_D$ is the index of refraction for the D line of the spectrum, V is the dispersive index, $R_1$ to $R_7$ are the surface curvatures, $t_1$ to $t_3$ are the lens thicknesses, $S_1$ to $S_3$ are the airspaces, $f$ is the focal length of the system and the plus and minus signs refer respectively to surfaces convex and concave to the incident light.

12. A spherical reflecting mirror and a correcting lens system disposed at the center of curvature of said mirror for correcting the spherical aberration thereof and having the following characteristics approximately:

| Lens | Glass | | Radii | Thicknesses |
|---|---|---|---|---|
| | $N_D$ | V | | |
| I | 1.61 | 57 | $R_1=+4.20f$ | $t_1=.12f$ |
| | | | $R_2=-4.20f$ | $S_1=.06f$ |
| II | 1.52 | 56 | $R_3=-1.80f$ | $t_2=.02f$ |
| | | | $R_4=+1.80f$ | $S_2=.06f$ |
| III | 1.61 | 57 | $R_5=+4.20f$ | $t_3=.12f$ |
| | | | $R_6=-4.20f$ | $S_3=1.85f$ |
| M | | | $R_7=-1.97f$ | | in which the first column gives the lens elements in order from the front and labels the mirror by the letter M, $N_D$ is the index of refraction for the D line of the spectrum, V is the dispersive index, $R_1$ to $R_7$ are the surface curvatures, $t_1$ to $t_3$ are the lens thicknesses, $S_1$ to $S_3$ are the airspaces, $f$ is the focal length of the system and the plus and minus signs refer respectively to surfaces convex and concave to the incident light.

13. A spherical reflecting mirror and a correcting lens system disposed at the focus of said mirror for correcting the spherical aberration thereof and having the following characteristics approximately:

| Lens | Glass | | Radii | Thicknesses |
|---|---|---|---|---|
| | $N_D$ | V | | |
| I | 1.52 | 56 | $R_1=-.66f$ | $t_1=.021f$ |
| | | | $R_2=+2.90f$ | $S_1=.0001f$ |
| II | 1.61 | 57 | $R_3=+2.79f$ | $t_2=.03f$ |
| | | | $R_4=-.81f$ | $S_2=1.02f$ |
| M | | | $R_5=-2.05f$ | | in which the first column gives the lens elements in order from the front and labels the mirror by the letter M, $N_D$ is the index of refraction for the D line of the spectrum, V is the dispersive index, $R_1$ to $R_5$ are the surface curvatures, $t_1$ and $t_2$ are the lens thicknesses, $S_1$ and $S_2$ are the airspaces, $f$ is the focal length of the system and the plus and minus signs refer respectively to surfaces convex and concave to the incident light.

JAMES LEONARD HOUGHTON.